US006883692B2

(12) United States Patent
Harden et al.

(10) Patent No.: US 6,883,692 B2
(45) Date of Patent: Apr. 26, 2005

(54) SAUCE HOLDER FOR FOLD OUT ARM REST

(75) Inventors: Matthew J. Harden, Hilliard, OH (US); Frank Dean Moburg, Whittier, CA (US); Kenneth K. Pilcher, Marysville, OH (US); Michael Tsay, Irvine, CA (US); Frank Paluch, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 121 days.

(21) Appl. No.: 10/300,101

(22) Filed: Nov. 20, 2002

(65) Prior Publication Data

US 2004/0094587 A1 May 20, 2004

(51) Int. Cl.[7] ................................................ B60R 7/00
(52) U.S. Cl. ...................... 224/275; 224/926; 206/563; 248/311.2
(58) Field of Search ................................. 224/275, 926; 220/575, 556, 4.24, 23.8; 206/518, 562, 563; 248/311.2

(56) References Cited

U.S. PATENT DOCUMENTS

| | | |
|---|---|---|
| 4,659,099 A | 4/1987 | Malone |
| 4,838,444 A * | 6/1989 | Bitel ........................ 220/4.24 |
| 4,854,466 A | 8/1989 | Lane, Jr. |
| 4,946,058 A | 8/1990 | Stamm |
| 5,069,375 A | 12/1991 | Flick |
| 5,114,108 A | 5/1992 | Olschansky |
| 5,427,292 A | 6/1995 | Rousch |
| 5,429,262 A | 7/1995 | Sharkey |
| 5,667,119 A | 9/1997 | Florence |
| 5,799,794 A | 9/1998 | Whitnell |
| 5,842,631 A | 12/1998 | Berger |
| 5,887,749 A * | 3/1999 | Schommer et al. ......... 220/575 |
| 6,076,700 A | 6/2000 | Manges |
| 6,095,058 A | 8/2000 | Earnhart |
| 6,152,302 A * | 11/2000 | Miller et al. ................ 206/549 |
| 6,152,362 A | 11/2000 | Rosenfeld |
| 6,193,201 B1 | 2/2001 | Babcock |
| 6,196,434 B1 | 3/2001 | Angran et al. |
| 6,216,946 B1 | 4/2001 | Cai |
| 6,230,969 B1 | 5/2001 | Spransy |
| 6,290,063 B1 | 9/2001 | Vogt et al. |
| 6,533,233 B1 * | 3/2003 | Thomas ................... 248/311.2 |

* cited by examiner

Primary Examiner—Stephen K. Cronin
(74) Attorney, Agent, or Firm—Fay, Sharpe, Fagan, Minnich & McKee, LLP

(57) ABSTRACT

A multifunctional tray in a vehicle armrest adapted to temporarily receive food and beverage items is provided. The tray includes a tray body and a beverage container receiving aperture defined in the tray body. A recessed bin is defined in the tray body spaced apart from the beverage container receiving aperture. The condiment container receiving aperture is defined in the tray body adjacent the recessed bin. The condiment container receiving aperture has a generally segmentary shape defined by a generally circular aperture wall and an intersection between the condiment container receiving aperture and the recessed bin. The segmentary shape is appropriately sized to selectively receive rectangular and circular shape associated condiment containers while permitting access to the associated condiment container through the recessed bin for removal of the associated condiment containers.

28 Claims, 3 Drawing Sheets

SAUCE HOLDER FOR FOLD OUT ARM REST

BACKGROUND OF THE INVENTION

1. Field of the Invention

The present invention relates to a multifunctional tray in a vehicle armrest adapted to temporarily receive food and beverage items. More particularly, the present invention relates to a condiment container receiving structure defined in a body of the multifunctional tray for receiving and retaining at least rectangular and circular shaped condiment containers while permitting access to the condiment containers. The present invention finds particular application as a sauce holder for a fold out armrest in a vehicle passenger cabin and will be described with particular reference thereto. It is to be appreciated, however, that the invention may relate to other similar environments and applications.

2. Discussion of the Art

Vehicle cup holders are ubiquitous. There is a wide variety of cup holder types provided in a wide variety of vehicles. Many vehicles also include trays or troughs for storing a wide variety of items in vehicle passenger cabins such as coin currency, glasses, mobile phones, etc. Vehicle consumers continue to desire functional compartments or structures in their vehicles including those that allow the vehicle operator and his/her passengers to more easily consume food and beverage items while in the vehicle.

Heretofore, vehicles have not included a structure that adequately receives and retains condiment containers. U.S. Pat. No. 5,667,119 discloses a fast food and condiment holding apparatus for use in a vehicle that includes a compartment for a package of french fries and a compartment for a rectangular package of ketchup. The rectangular configuration of the ketchup compartment is not suitable for other food/condiment containers that do not have a matching rectangular configuration or accommodating varying sizes of rectangular configured food containers. Further, the ketchup compartment does not permit suitable access to a ketchup package contained therein for removal purposes.

Another patent, U.S. Pat. No. 6,196,434, describes that a container of sauce can be placed in a slidable receptacle adjacent a cup holder. However, the slidable receptacle is circular and, like the '119 ketchup compartment, not suitable for other food/condiment containers that do not have a matching circular configuration or a similar size. Also, the receptacle does not permit adequate access for removal of sauce containers contained therein. Additionally, vehicles of the prior art have not included a suitable structure for holding condiment containers that is molded into a multifunctional tray adapted for use in a vehicle armrest. Thus, there is a need for a multifunctional tray having a condiment container receiving structure that is adapted to receive and retain varying shaped and sized condiment containers while providing removal access to retained condiment containers wherein the tray can be used in a vehicle arm rest.

The present invention provides a new and improved multifunctional tray in a vehicle arm rest adapted to temporarily receive food and beverage items that includes a condiment container receiving structure defined in a tray body that has a generally segmentary shape appropriately sized to selectively receive at least rectangular and circular shaped condiment containers while permitting access to the condiment containers for removal thereof. The present invention overcomes the foregoing difficulties and others while providing the aforementioned advantageous features.

BRIEF SUMMARY OF THE INVENTION

In accordance with one aspect of the present invention, a multifunctional tray in a vehicle armrest is provided and adapted to temporarily receive food and beverage items. More particularly, in accordance with this aspect of the invention, the tray includes a tray body and a beverage container receiving aperture defined in the tray body. A recessed bin is defined in the tray body spaced apart from the beverage container receiving aperture. A condiment container receiving aperture is defined in the tray body adjacent the recessed bin. The condiment container receiving aperture has a generally segmentary shape defined by a generally circular aperture wall and an intersection between the condiment container receiving aperture and the recessed bin. The segmentary shape is appropriately sized to selectively receive rectangular and circular shaped associated condiment containers while permitting access to the associated condiment containers through the recessed bin for removal of the associated condiment containers.

In accordance with another aspect of the present invention, a temporary and functional storage area structure in a vehicle is provided and adapted to receive food and beverage related items. More particularly, in accordance with this aspect of the invention, the storage area structure includes an arcuate wall section for preventing an associated food and beverage related item from passing therethrough. A base wall section is formed integrally with the arcuate wall section at a lower edge of the arcuate wall section. The base wall section is adapted to support the associated food and beverage related item. A storage area is defined by the base wall, the arcuate wall, and a plane generally defined by an upper edge of the arcuate wall section. A positioning member protrudes into the storage area for positioning the associated food and beverage related item in a location spaced apart from at least a portion of the arcuate wall section.

In accordance with still another aspect of the present invention, a tray in a vehicle passenger cabin is provided and adapted to receive a food related item and at least one miscellaneous item. The tray includes a substantially planar surface. A bin recess is defined in the planar surface for receiving at least one associated miscellaneous item. The bin recess includes at least one side wall extending away from the planar surface and bin base wall spaced apart from the planar surface and connecting to the bin base wall. The bin recess has a bin cavity defined by a plane of the planar surface, the bin base wall and the at least one side wall. A container recess is defined in the planar surface for receiving an associated food related item. The container recess includes at least one arcuate wall extending away from the planar surface and container base wall spaced apart from the planar surface and connecting to the arcuate wall. The arcuate wall has a first end in abutting contact with the at least one side wall and a second end in abutting contact with the at least one side wall. A channel opening for allowing removal access to the food related item is provided. The channel opening is defined by the container base, the arcuate wall first end, the arcuate wall second end, and the plane of the planar surface. The channel opening, the plane of the planar surface, the container base wall and the arcuate wall together define a container cavity.

In accordance with still yet another aspect of the present invention, a storage structure in a vehicle is provided for holding a food container while providing access to the food container for removal of the food container from the storage structure. More particularly, in accordance with this aspect of the invention, the storage structure includes a surface defining a container receiving aperture for receiving a food container. An arcuate wall section has a first end and a second end. The arcuate wall section extends from the surface and partially defines the container receiving aperture. A base wall section is spaced apart from the container receiving aperture at a lower edge of the arcuate wall section for supporting the food container. A channel opening is defined by the first and second ends of the arcuate wall and the base wall. A cavity is defined by the arcuate wall section, the base wall section and the channel opening. The cavity is positioned adjacent an open area such that the channel opening is formed at an intersection of the cavity and the open area.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE INVENTION

Figure 1:
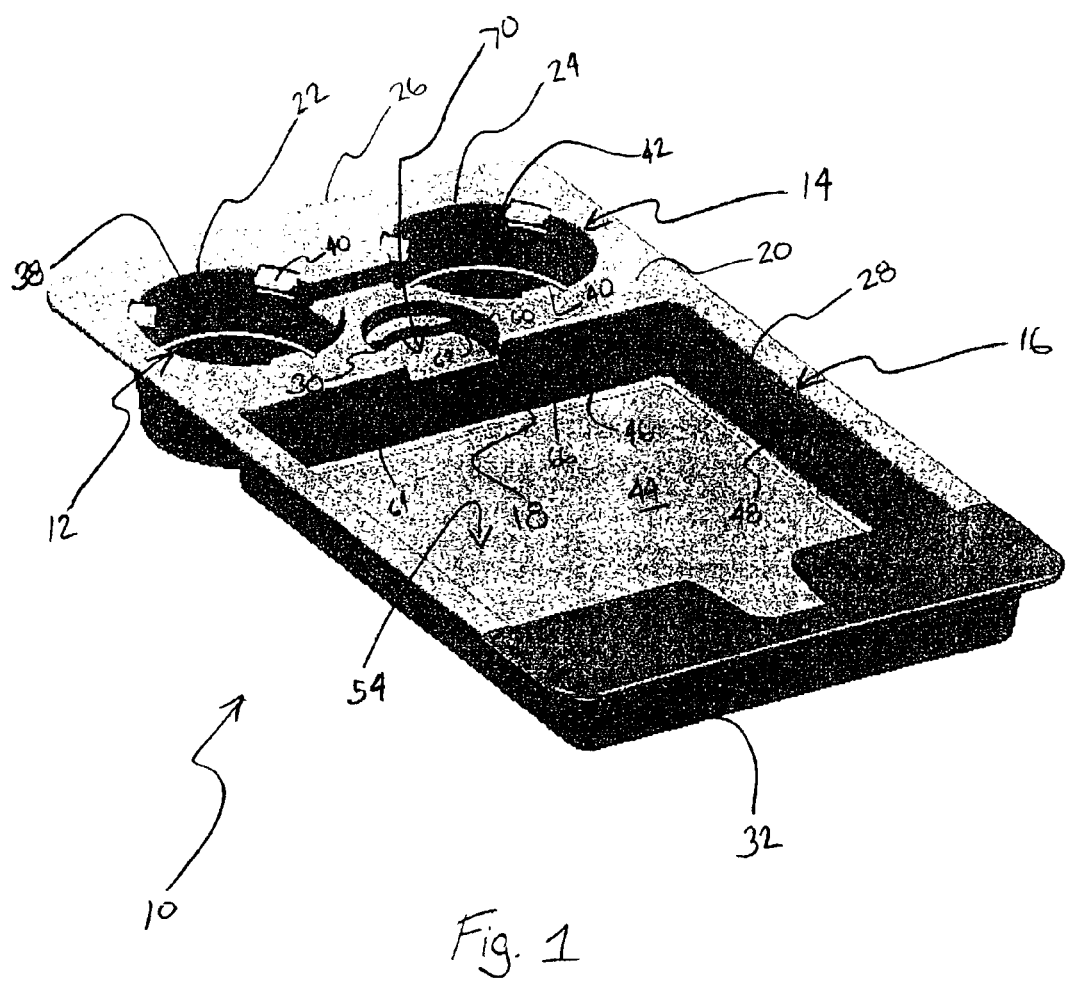
FIG. 1 is a perspective view of a multifunctional tray for use in an arm rest of a vehicle wherein the tray incorporates a condiment container receiving structure.

Referring now to the drawings wherein the showings are for purposes of illustrating a preferred embodiment of the invention only and not for purposes of limiting the same, FIG. 1 shows a multifunctional tray for use in a vehicle passenger cabin generally designated by reference numeral 10. More specifically, the tray 10 can be embedded in a vehicle arm rest (not shown). Specifically, the tray 10 is preferably disposed in a fold-down arm rest provided with one set of rear seats of a sport utility vehicle.

The tray or tray body 10 is provided with a plurality of temporary and functional storage area structures. The structures are generally ergonomically positioned within an arm rest of a vehicle for use by passengers of the vehicle. In the illustrated embodiment, the structures include a first food or beverage receiving structure 12, a second food or beverage receiving structure 14, a recessed bin or bin recess structure 16, and a third food or beverage receiving structure 18.

The first and second structures 12,14 are appropriately sized to receive conventional, circular-shaped beverage containers and other similar sized and shaped food containers. For example, a vehicle passenger may store a beverage cup from a fast food restaurant, a sundae container, a twelve ounce soft drink can, etc. in one or both of the structures 12,14. In the illustrated embodiment, the structures 12,14 are similarly sized and adapted for similar uses. However, it is contemplated that one or both of the structures 12,14 may be designed for different sized containers and/or different types of food and beverage related items.

The bin 16 is a larger, rectangular-shaped structure. While the bin 16 could be used to temporarily store a passenger's food items such as a sandwich from a fast food restaurant, the bin 16 is also suitable for storing a multitude of other items such as coin currency, mobile phones, glasses and the like. Thus, the bin serves as a multipurpose recessed storage area.

The third storage area structure 18 is appropriately sized to receive and contain conventional condiment containers such as fast food dipping sauces. The third structure 18, also referred to herein as a condiment container receiving structure, is relatively shallower than the first and second structures 12,14. Further, the condiment container receiving structure 18 is adapted to receive and retain condiment containers of varying shapes and to allow easy removal of condiment containers contained therein with access through the bin 16 as will be described in more detail below.

The tray 10 is preferably formed of a rigid plastic material. However, it is contemplated that other known materials can be used to form the tray, particularly, those that are currently adapted for use in vehicle passenger cabins. The plastic tray 10 includes a top surface 20 that defines a plurality of apertures corresponding to the aforementioned storage structures 12–18.

In the illustrated embodiment, the top surface 20 is generally a planar surface that, when installed in a vehicle, is generally coplanar with a top portion of the vehicle arm rest when the arm rest is in an operative position, i.e., down and resting on or adjacent a horizontal portion of a vehicle's seats. Of course, the top surface 20 does not have to be generally coplanar with the top portion of the vehicle arm rest or even generally planar itself. For example, the top surface 20 could have a stepped configuration wherein at least two different apertures of the plurality of apertures on the top surface 20 are at different elevations relative to one another.

The plurality of apertures defined in the top surface 20 includes a first beverage container receiving aperture 22 and a second beverage container receiving aperture 24 corresponding, respectively, to the first and second structures 14,16. The apertures 22,24 are spaced apart from one another on the planar surface 20 and located adjacent a first or front edge 26 of the tray 10.

The plurality of apertures further includes a bin aperture 28 and a condiment receiving aperture 30 corresponding, respectively, to the bin 16 and the third structure 18. The bin aperture 28 is spaced apart from the apertures 22,24 and positioned adjacent a second or back edge 32 of the tray 12. The condiment container receiving aperture 30 is positioned adjacent the bin aperture 28 in an area of the tray 12 that is located generally between the bin aperture 28 and the apertures 22,24.

Figure 2:
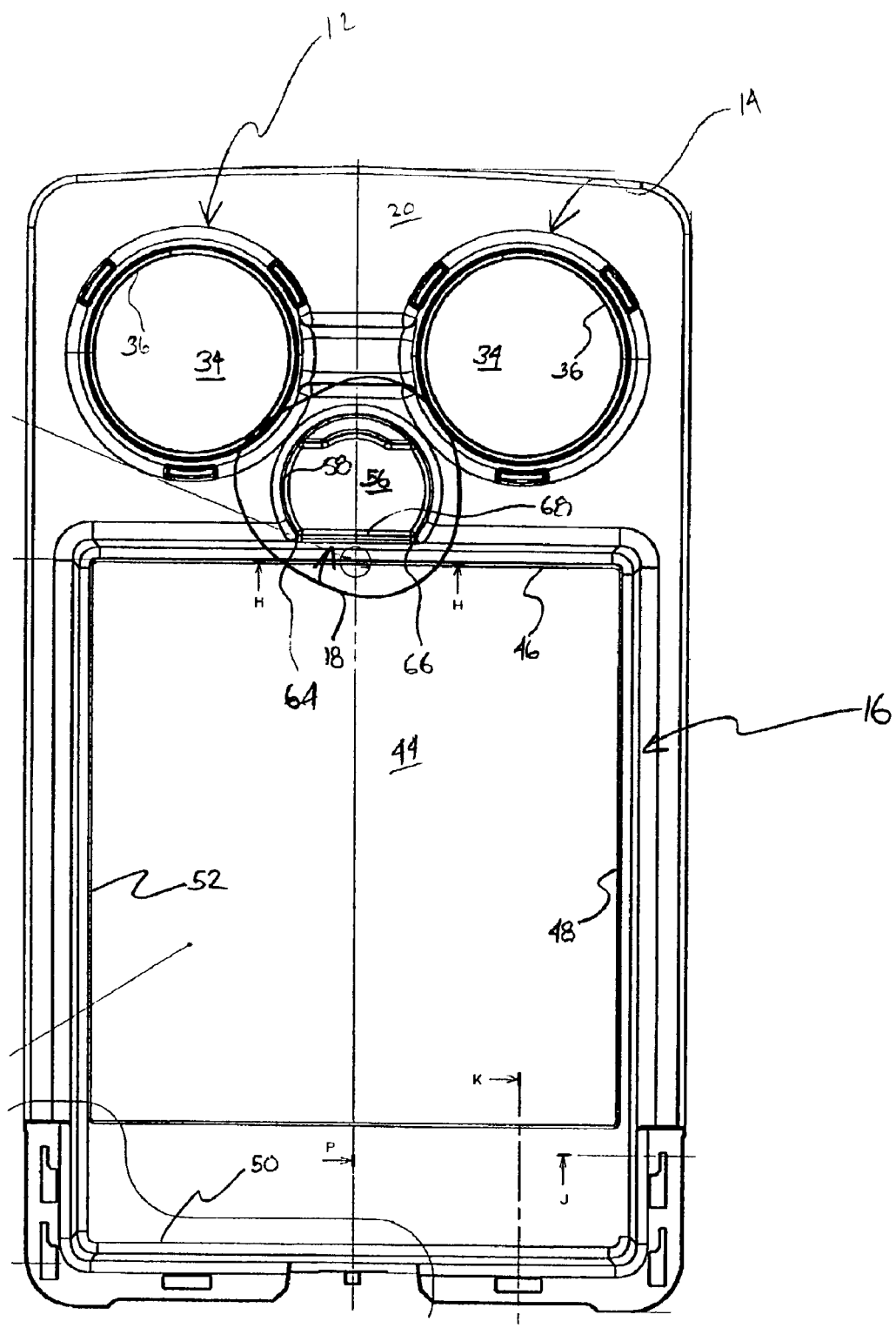
FIG. 2 is a plan view of the multifunctional tray of FIG. 1.

With additional reference to FIG. 2, the first structure 12 includes a circular base wall 34 spaced apart from the planar surface 20 and a circular side wall 36 extending between the base wall 34 and the planar surface 20. The walls 34,36, the aperture 22 and a plane of the planar top surface 20 together define a cup-shaped first receiving region 38. The first structure 12 additionally includes a plurality of radial protrusions 40 extending into the first region 38 from the side wall 36 adjacent the planar surface 20. In the illustrated embodiment, three protrusions 40 are provided and equally spaced apart around a circumference of the aperture 22.

The second structure 14 is the same as or similar to the first structure 12. The second structure includes a circular base wall 34 spaced apart from the planar surface 20 and a circular side wall 36 extending between the base wall 34 and the planar surface 20. The walls 34,36, the aperture 24 and the plane of the planar surface 20 together define a cup-shaped second receiving region 42. The second structure 14 includes protrusions 40 oriented in the same manner as those provided on the first structure 12.

The bin 16 includes a rectangular-shaped bin base wall 44 spaced apart from the planar top surface 20 and a plurality of side walls 46,48,50,52 formed integrally with the base wall 44 and the top surface 20. The side walls 46–52 extend between the top surface 20 and the base wall 44. A rectangular, box-shaped bin cavity 54 having an open upper end is defined by the base wall 44, the side walls 46–52 and the plane of the planar surface 20.

Figure 3:
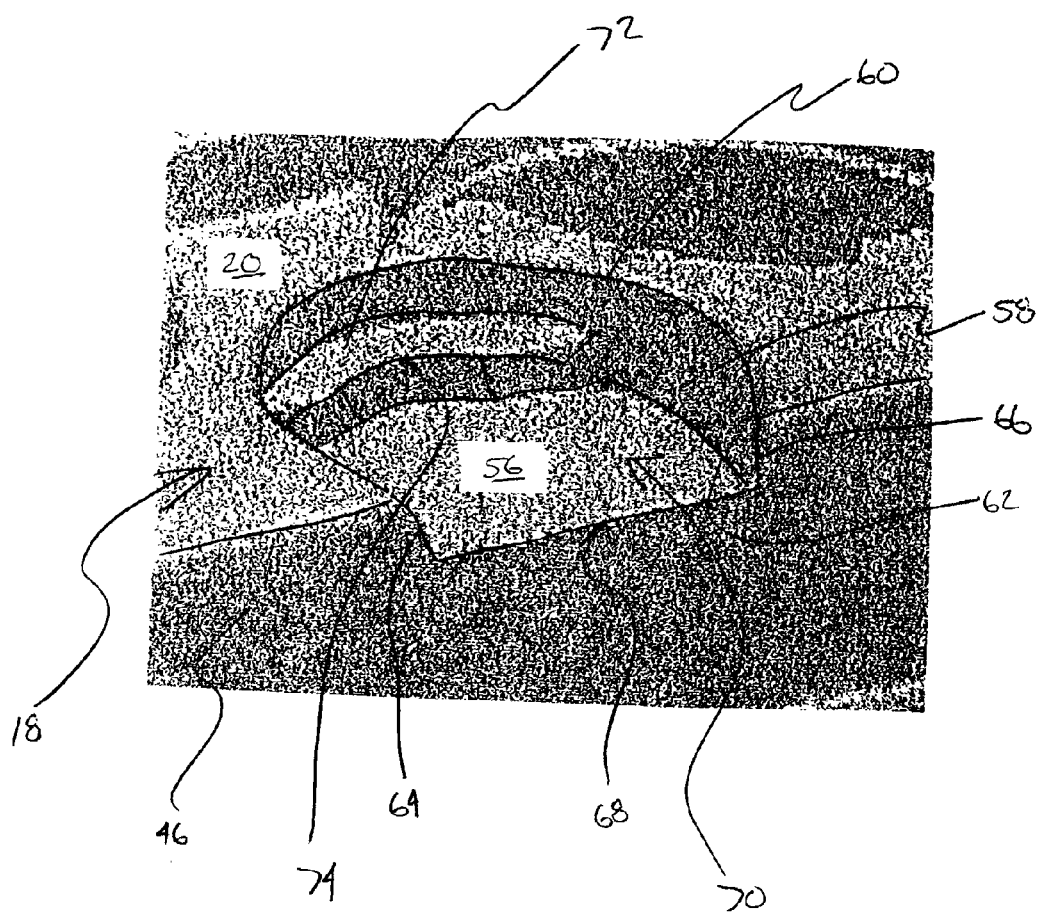
FIG. 3 is an enlarged partial perspective view of the condiment container receiving structure of FIG. 1.

With additional reference to FIG. 3, the condiment container receiving structure 18, also referred to herein as a container recess, includes a container base wall or base wall section 56 spaced apart from the planar surface 20 and adapted to support a food item such as a condiment or sauce container. An arcuate wall or arcuate wall section 58 extends between the base wall 56 and the top surface 20. The arcuate wall 58, also referred to herein as a circular aperture wall, has an upper edge 60 and a lower edge 62. The upper edge 60 is adjacent the top surface 20 and disposed in the plane of the top surface 20. The lower edge 62 is adjacent the bottom wall 56. The arcuate wall 58 is formed integrally with the base wall 56 at the lower edge 62.

The arcuate wall 58 is generally C-shaped and has a first end 64 and a second end 66. The ends 64,66 are generally coplanar with the side wall 46 that is adjacent the structure 18. More specifically, the first and second ends 64,66 are spaced apart from one another. Further, the first and second ends 64,66 are formed integrally and in abutting contact with the side wall 46 thereby forming a channel or channel opening 68 between or at the intersection of the condiment receiving structure 18 and the bin 16.

Although the condiment receiving structure 18 is illustrated and described herein as being adjacent the bin 16, it should be understood by those skilled in the art that the structure 18 could alternatively be positioned next to or adjacent any open area. For example, the structure 18 could be positioned adjacent another storage area structure or the structure 18 could be positioned along an edge of the tray 10 provided that the edge is adjacent an open area. Alternatively, the storage structure 18 could be used without the tray 10. For example, the storage structure 18 could be positioned in or near a vehicle door arm rest or anywhere else in the vehicle. In these alternate configurations, the channel opening 68 of the storage structure 18 is formed between or at the intersection of the structure 18 and the open area the structure 18 is positioned next to or adjacent. In any case, the storage structure 18 functions to receive a condiment container or like, prevent the same from moving transversely through the channel opening 68 to the open area and allow access to the received condiment container for removal from the storage structure 18 as will be described in more detail below.

In any arrangement, including that shown and described herein, the channel opening 68 forms a chord-shaped side of the condiment receiving structure 18. More specifically, the channel opening 68 and the arcuate wall 58 define the condiment container receiving aperture 30 as a segmentary-shaped opening. The channel opening 68 forms a chord of the segmentary-shaped aperture 30. The generally rectangular-shaped chord opening 68 has a height that extends from the base wall 56 to the plane of the top surface 20 and a longitudinal or chord length that extends from the first end 64 to the second end 66.

Within the structure 18, a storage area or container cavity 70 is defined. Specifically, the chord opening 68 subtends the arcuate wall 58 to delimit the container cavity 70. Thus, the cavity 70 is defined between the arcuate wall 58, the plane of the top surface 20, the base wall 56 and the chord opening 68. The cavity 70 and the aperture 30 in the top surface 20 are each appropriately sized to selectively receive conventional condiment containers and, specifically, condiment containers that are rectangular or circular shaped. Thus, a diameter of the aperture 30 is large enough to accommodate conventional condiment containers. Further, the structure 18 and, specifically, the cavity 70 are oriented in relation to the bin 16 and the chord opening 68 is appropriately sized to allow access to condiment containers held in the cavity 70 from the bin 16 for ready removal thereof.

Additionally, the chord length of the channel opening 68 is appropriately sized to prevent egress of a held condiment container through the channel opening 68 and into the bin 16 while not overly obstructing access to the held condiment container through the channel opening 68. More specifically, each food or condiment container that could be placed in the condiment structure has a major length. For example, when the condiment container is generally rectangular-shaped, the major length is the longitudinal length of the container. When the condiment container is generally circular-shaped, the major length is the diameter. Other containers have major lengths as well. For example, when the condiment container is generally elliptical-shaped, the major length is the major diameter of the container. Irrespective of the shape of the container, to prevent egress of a held condiment container through the channel opening 68, the chord length of the channel opening 68 is less than the major length of the condiment container held in the structure 18. Thus, if the condiment container is rectangular, the chord length is less than the longitudinal length of the container; if the condiment container is circular, the chord length is less than the diameter of the container, and so forth.

The relative sizes of the chord length and the condiment container major length, i.e., the condiment container major length is larger than the chord length, does not restrict a vehicle passenger from using the condiment receiving structure 18 for containers that have major lengths smaller than the chord length. However, the retention feature of the present invention preferably functions when the major length of the condiment container is greater than the chord length. Thus, when the major length of a food item or condiment container is greater than the chord length, the food item received in the structure 18 is retained in the cavity 70 and prevented from transversely moving into the bin cavity 54 of the bin 16.

With specific reference to FIG. 3, the condiment container receiving structure 18 includes a rotation prevention means for preventing some types of condiment containers held within the cavity 70 from rotating and exiting the cavity 70 through the channel opening 68. In the illustrated embodiment, the rotation prevention means is a rotation prevention member 72, also referred to herein as a positioning member and an insert, that protrudes into the cavity 70 from the arcuate wall 58. The arcuate-shaped rotation prevention member 72 extends along a portion of the arcuate wall 58 directly opposite the channel opening 68 and the bin 16. The rotation prevention member 72 further includes an arcuate notch 74 for centrally positioning arcuate condiment containers along the rotation prevention member 72.

The rotation prevention member 72 spaces a condiment container held in the cavity 70 away from the arcuate wall 58 and positions these held condiment containers adjacent the bin 16. Types of condiment containers held in the cavity that are prevented from rotating include rectangular-shaped condiment containers. As discussed above, rectangular condiment containers have a major length that is the longitudinal length. Rectangular condiment containers also have a minor length that is the length of the shorter sides of the rectangular container, i.e., the length of the sides that connect the longitudinal sides. In many rectangular-shaped condiment containers, the minor length of the shorter sides is not greater than the chord length of the channel opening. Thus, if a rectangular-shaped condiment container that is ordinarily held in the cavity because its major length exceeds the chord length were to rotate approximately ninety degrees, the shorter sides of the rectangular condiment container could fit through the chord opening 68 and allow the container to egress from the cavity 70. The rotation prevention member 72 prevents such a rectangular condiment container from rotating by occupying the space required for a conventional rectangular-shaped condiment container to rotate thereby preventing the shorter sides from being able to pass through the channel opening 68.

In the illustrated embodiment, the rotation prevention member 72 extends from the base wall 56 to a height along the arcuate wall 58 that is below the planar surface 20. This height difference or step effect between the arcuate wall 58 and the rotation prevention member 72 provides access to a portion of the condiment container held in the condiment structure 18 and allows a user of the condiment structure 18 to more easily grip the condiment container contained therein. The channel opening 68 also provides access to a portion of the condiment container held in the structure 18, including access to or near an underside of the condiment container, and permits the user of the condiment structure 18 to more easily grip condiment containers contained therein.

The invention has been described with reference to a preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

Having thus described the preferred embodiments, the invention is now claimed to be:

1. A multifunctional tray in a vehicle arm rest adapted to temporarily receive food and beverage items, the tray comprising:
    a tray body formed in an upper side of a vehicle arm rest;
    a beverage container receiving aperture defined in the tray body;
    a recessed bin defined in the tray body spaced apart from the beverage container receiving aperture and;
    a condiment container receiving aperture defined in the tray body adjacent the recessed bin, the condiment container receiving aperture having a generally segmentary shape defined by a generally circular aperture wall and an intersection between the condiment container receiving aperture and the recessed bin, said segmentary shape appropriately sized to selectively receive rectangular and circular shaped associated condiment containers while permitting access to said associated condiment containers through the recessed bin for removal of said associated condiment containers.

2. The multifunctional tray of claim 1 wherein the condiment container receiving aperture further includes a positioning member for spacing the associated condiment container away from at least a portion of the circular aperture wall and closer to said adjacent recessed bin.

3. The multifunctional tray of claim 2 wherein the positioning member extends only along a portion of the circular aperture wall opposite the recessed bin and serves to prevent rotation of the associated condiment container when said container is generally rectangular in shape.

4. The multifunctional tray of claim 2 wherein the positioning member includes a notch located centrally along a side of the positioning member facing the recessed bin.

5. The multifunctional tray of claim 1 wherein the intersection between the condiment container receiving aperture and the recessed bin forms a chord of the segmentary shaped condiment container receiving aperture, said associated condiment container has a diameter when said container is circular-shaped and has a longitudinal length when said container is rectangular-shaped, said chord is smaller than the diameter of a circular-shaped associated condiment container and the longitudinal length of the rectangular-shaped associated condiment container.

6. The multifunctional tray of claim 5 further including a rotation prevention member for preventing rectangular-shaped condiment containers from rotating and passing through the intersection.

7. A temporary and functional storage area structure in a vehicle adapted to receive food and beverage related items, the storage area structure comprising:
    an arcuate wall section for preventing an associated food and beverage related item from passing therethrough;
    a base wall section formed integrally with the arcuate wall section at a lower edge of the arcuate wall section, the base wall section adapted to support the associated food and beverage related item;
    a storage area defined by the base wall, the arcuate wall, and a plane generally defined by an upper edge of the arcuate wall section and;
    a positioning member protruding into the storage area from the arcuate wall section to position the associated food and beverage related item in a location spaced apart from at least a portion of the arcuate wall section.

8. The storage area structure of claim 7 wherein said positioning member is arcuate shaped.

9. The storage area structure of claim 7 wherein the positioning member includes an arcuate notch therein.

10. The storage area structure of claim 7 wherein the positioning member extends from the base wall section and has a height that is less than the height of the arcuate wall section.

11. The storage area structure of claim 7 wherein the arcuate wall section defines an opening that permits access to one side of the associated food and beverage related item when said item is received within the storage area.

12. The storage area structure of claim 11 wherein said opening is adjacent an associated recessed bin thereby providing access to said opening.

13. The storage area structure of claim 11 wherein the positioning member is located along the arcuate wall at a position generally opposite from said opening which causes the spaced apart location of the associated food and beverage item to be adjacent said opening.

14. The storage area structure of claim 13 wherein the associated food and beverage item has a major length and said major length is larger than a longitudinal length of said opening thereby preventing said associated food and beverage item from passing through said opening, said major length is a diameter of said associated food and beverage item when said item is circular-shaped and a longitudinal length of said associated food and beverage item when said associated food and beverage item is rectangular-shaped.

15. A tray in a vehicle passenger cabin adapted to receive a food related item and at least one miscellaneous item, the tray comprising:
    a substantially planar surface;

a bin recess defined in the planar surface for receiving at least one associated miscellaneous item, the bin recess including at least one side wall extending away from the planar surface and a bin base wall spaced apart from the planar surface and connecting to the at least one side wall, the bin recess having a bin cavity defined by a plane of the planar surface, the bin base wall and the at least one side wall;

a container recess defined in the planar surface for receiving an associated food related item, the container recess including at least one arcuate wall extending away from the planar surface and a container base wall spaced apart from the planar surface and connecting to the arcuate wall, the arcuate wall having a first end in abutting contact with the at least one side wall and a second end in abutting contact with the at least one side wall; and a channel opening located at an intersection between the bin recess and the container recess for allowing removal access to the food related item, the channel opening defined by the container base wall, the arcuate wall first end, the arcuate wall second end, and the plane of the planar surface, wherein the channel opening, the plane of the planar surface, the container base wall and the arcuate wall together defining a container cavity.

16. The tray of claim 15 wherein the container base wall is elevated relative to the bin base wall.

17. The tray of claim 15 wherein said arcuate wall has a height that is less than said at least one wall.

18. The tray of claim 15 wherein the channel opening forms a chord-shaped side of the container recess that subtends the arcuate wall and delimits the container cavity.

19. The tray of claim 18 wherein the chord-shaped side has a longitudinal length that is appropriately sized relative to a diameter of the container recess for retaining the associated food related item within the container cavity and preventing the associated food related item from moving into the bin cavity.

20. The tray of claim 18 wherein a diameter of the container recess is large enough to receive the associated food related item when the associated food related item is rectangular-shaped or generally circular-shaped and the chord-shaped side has a longitudinal length that is small enough to prevent transverse movement of the generally rectangular or circular-shaped associated food related item.

21. The tray of claim 15 wherein the container recess further includes a rotation prevention means for preventing rotation of the associated food related item when said food related item is quadniaterally-shaped.

22. The tray of claim 21 wherein the rotation prevention means is an insert extending along a portion of the arcuate wall in a position generally opposite the channel opening.

23. The tray of claim 22 wherein the insert is positioned adjacent the base wall and has a height less than a height of the arcuate wall for allowing gripping of the associated food related item when it is desirable to remove said food related item.

24. The tray of claim 22 wherein the insert includes a notch for centrally positioning the associated food related item in the container cavity when said food related item is circular-shaped.

25. A storage structure in a vehicle for holding a food container while providing access to the food container for removal of the food container from the storage structure, the storage structure comprising:

a surface defining a container receiving aperture for receiving a food container;

an arcuate wall section having a first end and a second end, the arcuate wall section extending from the surface and partially defining the container receiving aperture;

a base wall section spaced apart from the container receiving aperture at a lower edge of the arcuate wall section for supporting the food container;

a channel opening defined by the first and second ends of the arcuate wall and the base wall;

a cavity defined by the arcuate wall section, the base wall section and the channel opening, the cavity positioned adjacent an open area such that the channel opening is formed at an intersection of the cavity and the open area.

26. The storage area of claim 25 further including:

a rotation prevention member protruding from the arcuate wall section into the cavity for substantially preventing rotation of rectangular-shaped food containers.

27. The storage structure of claim 25 wherein the container receiving aperture is segmentary-shaped and the channel opening forms a chord-shaped side of the segmentary-shaped receiving aperture.

28. The storage area structure of claim 27 wherein the chord-shaped side has a longitudinal length that is smaller than a major length of the food container to prevent transverse movement of the food container from the cavity to the open area through the channel opening.

* * * * *

UNITED STATES PATENT AND TRADEMARK OFFICE
CERTIFICATE OF CORRECTION

PATENT NO. : 6,883,692 B2
DATED : April 26, 2005
INVENTOR(S) : Harden et al.

It is certified that error appears in the above-identified patent and that said Letters Patent is hereby corrected as shown below:

Column 10,
Line 2, replace "quadniaterally-shaped" with -- quadrilaterally-shaped --.

Signed and Sealed this

Fifth Day of July, 2005

JON W. DUDAS
*Director of the United States Patent and Trademark Office*